(12) United States Patent
Noh et al.

(10) Patent No.: US 9,175,157 B2
(45) Date of Patent: Nov. 3, 2015

(54) COMPOSITION OF POLYPROPYLENE HAVING IMPROVED TACTILITY AND SCRATCH RESISTANCE AND METHODS OF USE THEREOF

(71) Applicant: Hyundai Motor Company, Seoul (KR)

(72) Inventors: Jung Gyun Noh, Gyeonggi-do (KR); Jong Yoon Lee, Seoul (KR); Dae Sik Kim, Gyeonggi-do (KR); Woong Jae Boo, Gyeonggi-do (KR); Byung Wook Kang, Daejeon (KR); Ha Kyu Seo, Daejeon (KR)

(73) Assignees: Hyundai Motor Company, Seoul (KR); Kia Motors Corporation, Seoul (KR); GS CALTEX, Seoul (KR)

( * ) Notice: Subject to any disclaimer, the term of this patent is extended or adjusted under 35 U.S.C. 154(b) by 0 days.

(21) Appl. No.: 14/137,006

(22) Filed: Dec. 20, 2013

(65) Prior Publication Data
US 2015/0094413 A1  Apr. 2, 2015

(30) Foreign Application Priority Data

Sep. 27, 2013 (KR) .................. 10-2013-0114986

(51) Int. Cl.
| | |
|---|---|
| *C08K 7/14* | (2006.01) |
| *C08L 23/10* | (2006.01) |
| *C08L 23/12* | (2006.01) |
| *C08L 23/14* | (2006.01) |
| *C08J 3/22* | (2006.01) |

(52) U.S. Cl.
CPC .. *C08L 23/12* (2013.01); *C08J 3/22* (2013.01); *C08K 7/14* (2013.01); *C08L 23/14* (2013.01)

(58) Field of Classification Search
CPC ......... C08L 23/10; C08L 23/12; C08L 23/14; C08K 7/02; C08K 7/14
See application file for complete search history.

(56) References Cited

U.S. PATENT DOCUMENTS

| | | | | |
|---|---|---|---|---|
| 5,374,677 A | * | 12/1994 | Nishio et al. ................... | 524/451 |
| 5,514,745 A | * | 5/1996 | Yoshino ......................... | 524/494 |
| 6,541,568 B1 | * | 4/2003 | Ding et al. ...................... | 525/88 |
| 6,569,935 B2 | * | 5/2003 | Jeong et al. .................... | 524/456 |
| 6,608,130 B1 | * | 8/2003 | Zanka et al. ................... | 524/451 |
| 2007/0135547 A1 | * | 6/2007 | Chundury et al. ............. | 524/394 |

FOREIGN PATENT DOCUMENTS

| | | |
|---|---|---|
| JP | 11-222544 | 8/1999 |
| JP | 2013-067915 A | 4/2013 |
| JP | 2013-087915 A | 5/2013 |
| KR | 1020040065077 | 7/2004 |
| KR | 100714193 | 4/2007 |
| KR | 1020080061077 | 7/2008 |
| KR | 100854322 | 8/2008 |
| KR | 102009022835 | 3/2009 |
| KR | 101033275 | 4/2011 |

* cited by examiner

*Primary Examiner* — Brieann R Fink
(74) *Attorney, Agent, or Firm* — Mintz Levin Cohn Ferris Glovsky and Popeo, P.C.; Peter F. Corless

(57) ABSTRACT

The present invention provides a polypropylene resin composition in a mixture of a pellet (A) and a pellet (B), which is characterized by mixing them with various inorganic fillers and additives, wherein the pellet (A) comprises a long fiber-reinforced composite resin (a) obtained via a pultrusion impregnation process, and the pellet (B) comprises a composite resin (b) that includes polypropylene and thermoplastic elastomer. The polypropylene resin composition of the present invention can directly replace thermoplastic elastomer overmolding or painting in automotive parts to which such processes are routinely applied (e.g., interior components of the vehicle), which makes it possible to simplify and reduce the cost of the production process for such parts.

17 Claims, 3 Drawing Sheets

COMPOSITION OF POLYPROPYLENE HAVING IMPROVED TACTILITY AND SCRATCH RESISTANCE AND METHODS OF USE THEREOF

CROSS-REFERENCE TO RELATED APPLICATION

This application claims under 35 U.S.C. §119(a) the benefit of Korean Patent Application No. 10-2013-0114986 filed Sep. 27, 2013, the entire contents of which are incorporated herein by reference.

BACKGROUND OF THE INVENTION (a) Technical Field

The present disclosure relates to a polypropylene resin composition having excellent tactility and scratch resistance. More particularly, it relates to a polypropylene resin composition in which reinforcing fibers (e.g., long fibers) are added to thermoplastic elastomer, which enhances the tactility of the thermoplastic elastomer while satisfying requirements for hardness, impact strength and formability (including ease and/or efficiency of formation).

(b) Background Art

In general, automotive interior parts have been manufactured according to various product specifications, which include leather wrapping, polyurethane spraying, in-mold graining (IMG), thermoplastic elastomer sheeting, thermoplastic elastomer over-molding, painting, non-painting and the like, depending on quality requirements. Expensive materials with high quality textures such as leather wrapping or polyurethane spraying have been widely applied to luxury vehicles, and in-mold graining or over-molding processes have also been applied to varying extent in intermediate class vehicles. For cheaper vehicles, painting or non-painting has generally been used, and such processes are also applied to a sizable number of parts even in high/middle-priced vehicle types. Recently, as the importance of enhancing surface tactility has been recognized, paints possessing high elasticity have been more broadly used. However, implementing a painting process that uses a high elasticity paint can cause production costs to rise while also provoking additional issues related to environmental safety and regulations.

Korean Patent No. 10-0857185 discloses a fiber-reinforced polypropylene resin composition having high rigidity, impact resistance and heat resistance, which is obtained by mixing polypropylene resin, inorganic fibers, thermoplastic rubber elastomer, inorganic fillers and a compatibilizing agent. This resin composition satisfies requirements for high rigidity, heat resistance and impact resistance for automotive parts; however, its tactility is very poor. Thus, a limitation of such resins is that a product using such resins must still be painted prior to releasing such a product.

Accordingly, there is a need to develop a polypropylene resin composition that possesses excellent tactility and scratch resistance while also maintaining good physical properties suitable for broad applications as automotive exterior and/or interior materials.

The above information disclosed in this Background section is only for enhancement of understanding of the background of the invention and therefore it may contain information that does not form the prior art that is already known to a person of ordinary skill in the art.

SUMMARY OF THE DISCLOSURE

The present invention is based, at least in part, upon efforts the present inventors have undertaken to overcome the above-detailed shortcomings of the prior art. Specifically, the current inventors have discovered that when reinforcing fibers such as long fibers are added to thermoplastic elastomer, it is possible to obtain a polypropylene resin composition that possesses both enhanced tactility (in certain embodiments, tactility that is as high as thermoplastic elastomer) and excellent scratch resistance, while also satisfying requirements for hardness, impact strength and ease/efficiency of formation.

In one aspect, the present invention provides a polypropylene resin composition having high tactility and scratch resistance, comprising:

a pellet (A) prepared using a resin composition (A) which is composed of (a-1) about 22 to about 58 wt % polypropylene resin, including polypropylene homopolymer alone or a mixture of polypropylene homopolymer and polypropylene-ethylene copolymers;

(a-2) about 2 to about 8 wt % modified polypropylene resin; and (a-3) about 40 to about 70% wt % long fibers having a length of about 5 to about 20 mm; and a pellet (B) prepared using a resin composition (B) which is composed of (b-1) about 1 to about 5 wt % polypropylene homopolymer;

(b-2) about 30 to about 45 wt % polypropylene-ethylene copolymer;

(b-3) about 50 to about 65 wt % thermoplastic elastomer; and (b-4) about 0 to about 5 wt % inorganic filler.

In certain embodiments, the molar ratio of said pellet (A) to said pellet (B) is in the range of about 1:3 to about 1:1.

In another embodiment, the polypropylene-ethylene copolymer (a-1, b-2) has an average molecular weight ranging from about 80,000 to about 600,000 g/mol and a specific gravity ranging from about 0.89 to about 0.91.

In still another embodiment, the modified polypropylene (a-2) is a polypropylene polymer grafted with about 0.5 to about 5 wt % unsaturated carbonic acid or a derivative thereof, and has an average molecular weight ranging from about 100 to about 5,000 g/mol.

In yet another embodiment, the unsaturated carbonic acid is one or more of maleic acid, acrylic acid, methacrylic acid and anhydrous maleic acid.

In still yet another embodiment, the long fiber (a-3) is one or more of glass fiber, carbon fiber, hemp fiber, cellulose fiber and volcanic rock fiber.

In a related embodiment, the glass fiber has a diameter ranging from about 10 to about 30 μm.

In another embodiment, the polypropylene-ethylene copolymer (a-1, b-2) is copolymerized such that an ethylene content therein is about 3 to about 30 wt %.

In still another further embodiment, the thermoplastic elastomer (b-3) is olefinic thermoplastic elastomer, styrenic thermoplastic elastomer, urethanic thermoplastic elastomer or a mixture thereof.

In yet another embodiment, the pellet (B) prepared using a resin composition (B) includes 2-fold lower oil compared with that of the styrenic thermoplastic elastomer.

In a related embodiment, the oil is paraffin-based oil, aromatic oil or naphtha-based oil.

In a still further embodiment, the inorganic filler (b-4) is magnesium-based needle-shaped whisker, titanic acid-based needle-shaped whisker or precipitated calcium carbonate.

In another aspect, the present invention provides a molded article prepared by using the polypropylene resin composition of the present invention. Optionally, the article is an automobile part.

A further aspect of the invention provides a method for preparing a molded article possessing high tactility and scratch resistance that involves contacting a polypropylene resin composition of the invention with an article, thereby conferring high tactility and scratch resistance to the article.

Another aspect of the invention provides a method for enhancing the tactility and scratch resistance of an automotive part that involves applying a polypropylene resin composition of the invention to the automotive part, thereby enhancing the tactility and scratch resistance of the automotive part.

A final aspect of the invention provides a kit for enhancing the tactility and scratch resistance of an article which includes a polypropylene resin composition of the invention and instructions for its use.

Other aspects and embodiments of the invention are discussed infra.

BRIEF DESCRIPTION OF THE DRAWINGS

The above and other features of the present invention will now be described in detail with reference to certain exemplary embodiments thereof illustrated in the accompanying drawings, which are provided herein by way of illustration only, and thus are not intended to limit the scope of the present invention in any manner.

In FIG. 2A, Sample 1 exhibited 0.5 of gloss (at 60 degrees), 0.05 of scratch (ΔL), and 41.5 of hardness (D), and in FIG. 2B, the sample of Reference Comparative Sample exhibited 1.4 of gloss (at 60 degrees), 1.96 of scratch (ΔL), and 65 of hardness (D).

Figure 1:
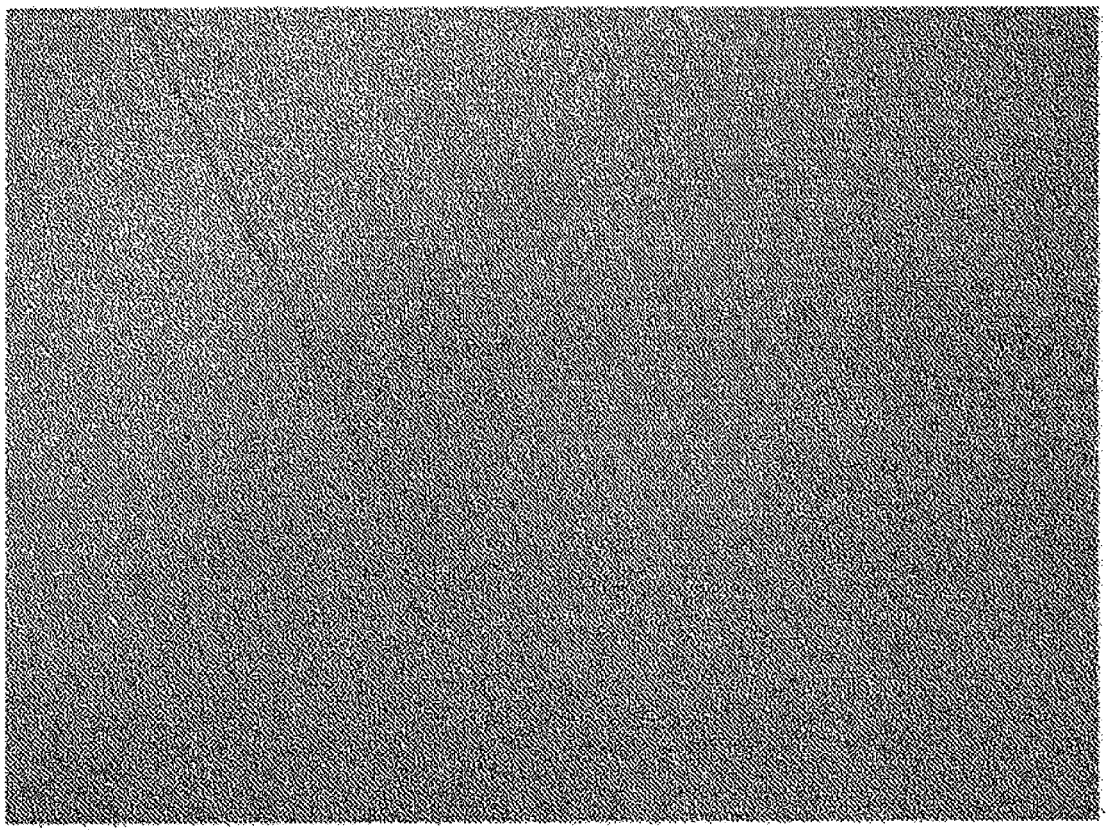
FIG. 1 is a photograph of a texture surface which shows the result of assessing surface tactility of Sample 1 of the present invention.

It should be understood that the appended drawings are not necessarily to scale, and provide a somewhat simplified representation of various features illustrative of the basic principles of the invention. As is evident to the skilled artisan, the specific design features of the present invention as disclosed herein, including, for example, specific dimensions, orientations, locations, and shapes will be determined in part by the particular intended application and use environment.

In the above Figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the current description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention relates to a polypropylene resin composition in a mixture of a pellet (A) and a pellet (B), which is characterized by mixing them with various inorganic fillers and additives, wherein the pellet (A) is composed of long fiber-reinforced polypropylene resin (A) obtained via a pultrusion impregnation to process, and the pellet (B) is made of polypropylene resin including thermoplastic elastomer.

The pellet (A) is characterized by being made with a polypropylene resin composition (A) which is composed of:
  (a-1) about 22 to about 58 wt % polypropylene resin, which includes polypropylene homopolymer alone or a mixture of polypropylene homopolymer and polypropylene-ethylene copolymers;
  (a-2) about 2 to about 8 wt % modified polypropylene resin; and
  (a-3) about 40 to about 70% wt % long fibers having a length of about 5 to about 20 mm.

In particular, as a matrix resin into which the long fibers are impregnated, polypropylene resin (a-1) can be used. The polypropylene resin (a-1) is a crystalline polymer which is composed of polypropylene homopolymer (whose major component is polypropylene monomer) and polypropylene-ethylene copolymer including ethylene, and, as such, polypropylene-ethylene copolymer alone or a mixture of polypropylene homopolymer and polypropylene-ethylene copolymer can be used.

In certain embodiments, polypropylene homopolymer having a pentad ratio (% mmmm) of about 96% or higher, optionally about 96.5% or higher, or even about 97% or higher is used, as determined by $^{13}$C-NMR. Pentad ratios of lower than about 96% risk lowering physical properties such as rigidity and heat resistance. Further, in certain embodiments the polypropylene homopolymer has a limiting viscosity [η] of about 0.7 to about 2.5 dl/g, optionally about 0.85 to about 2.2 dl/g, and in certain embodiments, about 0.9 to about 2.0 dl/g, as determined in decalin at 135° C. When the limiting viscosity is lower than about 0.7 dl/g, impact strength is decreased, and when it exceeds about 2.5 dl/g, formability (including ease and/or efficiency of formation) is lowered. In addition, in certain embodiments, the polypropylene homopolymer has a melt index of about 10 to about 25 g/10 min at 230° C. If the melt index is lower than about 10 g/10 min, there is a risk of lowering impregnability with long glass fibers and of hardness, and if it exceeds about 25 g/10 min, impact properties become poor.

In certain embodiments, polypropylene-ethylene copolymer having an average molecular weight of about 80,000 to about 600,000 g/mol, a specific gravity of about 0.89 to about 0.91, and a limiting viscosity [η] of about 3.0 to about 6.0 dl/g, as determined in 135° C. decalin of a xylene extract, is used. Optionally, the limiting viscosity is about 3.5 dl/g or higher, especially about 4.0 dl/g or higher. When the limiting viscosity is lower than about 3.0 dl/g, there is a risk of decreasing impact strength. In certain embodiments, polypropylene-ethylene copolymer having a melt index of about 100 to about 2,000 g/10 min at 230° C. is used. Optionally, polypropylene monomer and ethylene monomer are copolymerized at a weight ratio of about 5:1 to about 25:1. When converted, in certain embodiments, the two monomers are copolymerized such that ethylene content in the resulting copolymer becomes about 3 to about 30 wt %, or optionally about 3 to about 17 wt %. If the ethylene content is lower than about 3 wt %, there is a risk of lowering impact resistance, and if it exceeds about 30 wt %, there is a risk of hardness in the resulting product and of decreased extrusion productivity.

Meanwhile, with respect to the mixture of polypropylene homopolymer and polypropylene-ethylene copolymer, in certain embodiments, about 100 to about 70 wt % of polypropylene-ethylene copolymer are mixed based on about 0 to about 30 wt % of polypropylene homopolymer, optionally, about 100 to about 80 wt % of polypropylene-ethylene copolymer is mixed based on about 0 to about 20 wt % of polypropylene homopolymer, which is favorable for impact strength and fluidity. Since polypropylene homopolymer has poor impact resistance and polypropylene-ethylene copolymer shows insufficient formability (including ease and/or efficiency of formation), as well as hardness and heat resistance, these two substances can be used complementarily to each other within the above ranges.

The polypropylene resin can be polypropylene homopolymer alone or a mixture of polypropylene homopolymer and polypropylene-ethylene copolymer, optionally used in an amount of about 22 to about 58 wt %. If the polypropylene resin is lower than about 22 wt %, there is a risk of lowering workability of product injection and impregnation properties of product extrusion, and if it exceeds about 58 wt %, physical properties such as hardness and impact strength may be lowered.

In some embodiments, about 2 to about 8 wt % of the modified polypropylene resin (a-2) is used. If the amount of the modified polypropylene resin is lower than about 2 wt %, mechanical thermal properties are deteriorated due to poor dispersibility, and the appearance of a product is impaired due to aggregation between inorganic fillers. If it exceeds about 8 wt %, a bad smell peculiar to modified polypropylene and molding defects (e.g., flow marks) are generated.

In certain embodiments, the modified polypropylene is a polypropylene polymer grafted with unsaturated carbonic acid or a derivative thereof. Optionally, the unsaturated carbonic acid or a derivative thereof can be maleic acid, acrylic acid, methacrylic acid, anhydrous maleic acid or a mixture thereof and, in certain embodiments, is grafted on the polypropylene polymer at a content of about 0.5 to about 5 wt %, optionally about 0.7 to about 1.5 wt %. Within the above ranges, dispersibility during the grafting process can be improved.

Further, in order to finely disperse the thermoplastic elastomer and inorganic filler in the polypropylene resin, one can use modified polypropylene having an average molecular weight of about 100 to about 5,000 g/mol.

In certain embodiments, the long fiber (a-3) being impregnated into the matrix resin has a diameter of about 3 to about 100 micron (μ) and a length of about 5 to about 20 mm, and is optionally used at a content of about 40 to about 70 wt %. If the content of the long fiber is lower than about 40 wt % based on the resin composition which forms a pellet (A), hardness and heat resistance are decreased, and if it exceeds about 70 wt %, flowability is sharply reduced, which results in reduced formability (including lowered ease and/or efficiency of formation). In addition, if the length of the long fiber is lower than about 5 mm, the remaining length of the fiber in a resulting product obtained after the injection process can become too short, thereby creating a risk of deteriorating physical properties, and if it exceeds about 20 mm, the packaging of raw materials can become too bulky, creating a risk of lowering transfer efficiency of raw materials due to a bridge phenomenon caused when a hopper for an injection machine is inserted. Thus, in certain embodiments, long fiber within the above range(s) is used.

In certain embodiments, the long fiber can be glass fiber, carbon fiber, hemp fiber, cellulose fiber, volcanic rock fiber or a combination thereof. Optionally, glass fiber having a diameter of about 10 to about 30 μm is used. If the diameter is lower than about 10 μm, there is a risk of yarn breakage occurring during the production of a product by extrusion, while if it exceeds about 30 μm, there is a risk of decreasing processability and impregnability. Thus, in certain embodiments, long fiber within the above range(s) is used.

In one embodiment, the long fiber can be a long glass fiber. Exemplary long glass fibers include E GLASS, ECR GLASS with improved corrosion resistance, S,S-2,R,T GLASS with high strength, and C.A GLASS with acid resistance. In certain embodiments, E-GLASS is used, as its use can provide commercial advantage. In additional embodiments, a chop strand with a length of about 8 to about 16 mm is used as a long fiber pellet impregnated in a matrix resin. If the length of the pellet is lower than about 8 mm, the remaining fiber length can become short, thereby decreasing impact resistance, and if it exceeds about 16 mm, there is a risk of lowering processability and formability (including ease and/or efficiency of formation) of a product. Thus, in certain embodiments, long fiber within the above range is used.

In certain embodiments, the pellet (B) is made with a polypropylene resin composition (B) which is composed of (b-1) about 1 to about 5 wt % of polypropylene homopolymer, (b-2) about 30 to about 45 wt % of polypropylene-ethylene copolymer, (b-3) about 50 to about 65 wt % of thermoplastic elastomer, and (b-4) 0 to about 5 wt % of an inorganic filler.

For the polypropylene polymer used in the pellet (B), in certain embodiments, about 1 to about 5 wt % of polypropylene homopolymer (b-1), and about 30 to about 45 wt % of polypropylene-ethylene copolymer (b-2) is used. If the content of the polypropylene homopolymer (b-1) is lower than about 1 wt %, there is a risk of decreasing kneadability of resins, and if it exceeds about 5 wt %, there is a risk of lowering tactility due to an increase in hardness. Further, if the polypropylene ethylene copolymer (b-2) is lower than about 30 wt %, there is a risk of decreasing heat resistance, and if it exceeds about 45 wt %, there is a risk of lowering tactility due to an additional increase in hardness. Thus, in certain embodiments, the polypropylene polymer is used within the above range.

In certain embodiments, the polypropylene-ethylene copolymer is copolymerized to have an ethylene content of about 3 to about 30 wt %. If the ethylene content is lower than about 3 wt %, there is a risk of lowering impact resistance, and if it exceeds about 30 wt %, there is a risk of decreasing hardness of a final product and of reduced productivity of extrusion. Thus, in certain embodiments, the polypropylene-ethylene copolymer is used within the above range.

In some embodiments, the polypropylene-ethylene copolymer possesses an average molecular weight of about 80,000 to about 600,000 g/mol and a specific gravity of about 0.89 to about 0.91. In certain embodiments, the polypropylene-ethylene copolymer possessing an average molecular weight and a specific gravity within this range is used. Optionally, this is the same polypropylene-ethylene copolymer as that of the pellet (A).

In certain embodiments for the polypropylene polymers used in the pellet (B), a mixed ratio of polypropylene homopolymer and polypropylene-ethylene copolymer is regulated so as to improve flowability of resins and so as to maintain hardness thereof. Optionally, polypropylene homopolymer and polypropylene-ethylene copolymer are mixed at a weight ratio of about 1:10 to about 1:8. If the mixed ratio is lower than about 1:10, there is a risk of lowering kneadability of resins, and if it exceeds 1:8, there is a risk of decreasing tactility due to an increase in hardness. Thus, in certain embodiments, the polypropylene homopolymer and polypropylene-ethylene copolymer are mixed within the above range.

In certain embodiments, the thermoplastic elastomer (b-3) is mixed with a conventional thermoplastic resin composition, followed by melting and fusion. Optionally, they are combined such that the surface of the thermoplastic elastomer (b-3) is endowed with soft and fluffy tactility and low elasticity (softness).

In some embodiments, the thermoplastic elastomer is olefinic thermoplastic elastomer, styrenic thermoplastic elastomer, urethanic thermoplastic elastomer or a mixture thereof.

Since olefinic thermoplastic elastomer has excellent impact resistance, it can be effectively applied to automotive parts requiring high impact strength. The styrenic thermoplastic elastomer is capable of swelling by oil, which makes it possible to achieve low hardness. In certain embodiments, depending on the kind of thermoplastic elastomer used, there is no need to use oil; however, if needed, oil can be added in an amount of up to about 2-fold higher than that of thermoplastic elastomer.

Often when the styrenic thermoplastic elastomer does not include oil, it shows excellent tensile strength, and thus, it is suitable for manufacturing tough materials. However, because most styrenic thermoplastic elastomers have relatively high hardness, they commonly include oil so as to reduce hardness, and optionally, oil is included at about a 2-fold lower level than that of the styrenic thermoplastic elastomer. If the oil content exceeds 2-fold higher than the elastomer, there is a risk of oil migrating to the surface at a temperature of 80° C. or higher, and thus, the surface of an injection molding article becomes sticky. Thus, in certain embodiments, the styrenic thermoplastic elastomer includes oil within the above range.

Furthermore, the urethanic thermoplastic elastomer shows excellent surface properties, and thereby, is highly scratch resistant.

In certain embodiments, about 50 to about 65 wt % of thermoplastic elastomer based on the weight of the pellet (B) is used. If the content of the thermoplastic elastomer is lower than about 50 wt %, there is a risk of lowering impact properties, hardening the surface or deteriorating surface tactility, and if it exceeds about 65 wt %, there is a risk of causing inferior cutting during the manufacture of a pellet and a drastic reduction in hardness. Thus, in certain embodiments, the thermoplastic elastomer is used within the above range.

The inorganic filler (b-4) can be a needle-shaped whisker or a short fiber. In general, whisker is divided into magnesium-based whisker, titanic acid-based whisker and precipitated calcium carbonate, and optionally, e whisker is used that possesses a length of about 10 to about 30 μm and an average diameter of about 0.3 to about 1 μm.

Meanwhile, as a short fiber suitable for improving physical properties, glass fiber, carbon fiber, aramid fiber, hemp fiber, cellulose fiber, volcanic rock fiber or a mixture thereof can be used. Optionally, especially when the short fiber is applied to coloring composition parts having no surface treatment, glass fiber with a minor change in color can be used.

In certain aspects, the present invention describes a resin composition that possesses improved elasticity while maintaining appropriately cushiony tactility, via the addition of whisker of high aspect ratio or of fiber. The resin composition thereby obtained can be injected and fastened in a single article without over-molding with a structural material, which makes it possible to apply a composition of the invention to automotive parts present within a driver or passenger's reach, such as a crash pad, a door trim, a pillar trim or a sun visor, via direct injection.

In addition, in certain embodiments, the pellet (A) and pellet (B) of the present invention are used in a dry mixture, Optionally, the pellet (A) and pellet (B) are mixed at a weight ratio of about 1:3 to about 1:1. If the weight ratio is lower than about 1:3, the ratio of thermoplastic elastomer is too high, thereby causing dispersion risks of various additives, and if it exceeds about 1:1, the ratio of long fibers is too high, which can produce a tough surface and cause molding difficulties.

Further, in order to improve performance of molded articles and processing properties thereof, the resin composition of the present invention can further comprise one or more additives such as antioxidants, neutralizing agents, antistatic agents, UV stabilizing agents, fatty acid amide anti-scratching agents, siliconic anti-scratching agents and the like, in addition to the above major ingredients. These additives can be used in a suitable amount for maintaining surface quality.

Since the resin composition of the present invention as obtained herein shows excellent tactility and scratch resistance while possessing good physical properties suitable for wide application in automotive materials, it can be effectively used as a substitute for thermoplastic elastomer overmolding or coating of automotive parts.

EXAMPLES

The following examples illustrate the invention and are not intended to limit the same.

Example 1

Preparation of Samples

Samples 1-2

Polypropylene resin compositions were prepared by using ingredients as listed below in Tables 1 and 2 according to mixed ratios as indicated below in Table 5 and subjected to a twin screw extruder, to thereby prepare pellets. After that, the pellets were injected under the pre-determined injection condition of 200 to 240° C. in a 250-ton injection molding machine, thereby obtaining Samples 1 and 2. These samples were subjected to measurement of thermal/mechanical properties and scratch resistance.

TABLE 1

Pellet (A): long fiber-reinforced polypropylene resin composition

Composition (weight ratio)

| Ingredients | Homo polypropylene | Modified Polypropylene | Long Glass Fiber | Additives |
|---|---|---|---|---|
| 100 | 37 | 3 | 60 | <1 PHR |

* PHR = part per hundred resin
* modified polypropylene: 2 wt % maleic acid-grafted polypropylene
* long glass fiber: OCV Glass Fiber

TABLE 2

Pellet (B): polypropylene resin composition

Composition (weight ratio)

| Ingredients | Homo Polypropylene | Polypropylene-Ethylene Copolymer | Ethylene-Octene Copolymer | Additives |
|---|---|---|---|---|
| 100 | 5 | 35 | 60 | <1 PHR |

Comparative Samples 1-3

In accordance with the method described above for Samples 1 and 2, Comparative Samples 1-3 were prepared by using ingredients as listed above Tables 1 and 2 according to mixed ratios as indicated below in Table 5.

Comparative Samples 4-7

In accordance with the same method as described in Samples 1 and 2, Comparative Samples 4-7 were prepared by using a long fiber-reinforced polypropylene resin composition [pellet (A)] as shown above in Table 1 and ingredients as indicated below in Tables 3 and 4 [pellet (B-1) and pellet (B-2)] according to mixed ratios as listed below in Table 6.

TABLE 3

Pellet (B-1): Polypropylene resin composition

Composition (weight ratio)

| Ingredients | Homo Polypropylene | Propylene-Ethylene Copolymer | Ethylene-Octene Copolymer | Additives |
|---|---|---|---|---|
| 100 | 5 | 50 | 45 | <1 PHR |

TABLE 4

Pellet (B-2): Polypropylene resin composition

Composition (weight ratio)

| Ingredients | Homo Polypropylene | Propylene-Ethylene Copolymer | Ethylene-Octene Copolymer | Additives |
|---|---|---|---|---|
| 100 | 5 | 20 | 75 | <1 PHR |

TABLE 5

Mixed ratio 1 of polypropylene resin composition

Dry mixed ratio (wt %)

| | Sample 1 | Sample 2 | Comparative Sample 1 | Comparative Sample 2 | Comparative Sample 3 |
|---|---|---|---|---|---|
| Long fiber-reinforced polypropylene resin composition pellet (A) | 30 | 40 | 20 | 60 | 100 |
| Polypropylene resin composition pellet (B) | 70 | 60 | 80 | 40 | — |

TABLE 6

Mixed ratio 2 of polypropylene resin composition

Dry mixed ratio (wt %)

| Items | Sample 1 | Sample 2 | Comparative Sample 4 | Comparative Sample 5 | Comparative Sample 6 | Comparative Sample 7 |
|---|---|---|---|---|---|---|
| Long fiber-reinforced polypropylene resin composition pellet (A) | 30 | 40 | 30 | 40 | 30 | 40 |
| Polypropylene resin composition pellet (B) | 70 | 60 | — | — | — | — |
| Polypropylene resin composition pellet (B-1) | — | — | 70 | 60 | — | — |
| Polypropylene resin composition pellet (B-2) | — | — | — | — | 70 | 60 |

Example 2

Measurement of Physical Properties of Samples

The results shown in Tables 7 and 8 represented mean values obtained by measuring physical properties of 7 samples and excluding maximum and minimum values therefrom. The physical properties were measured as follows.

(1) Measurement of intrinsic viscosity: Polypropylene polymer was completely dissolved in decalin at 135° C. Viscosities of solutions having a different concentration of 0.1 to 0.5 g/dl were measured by using an Ubbelohde viscometer. Intrinsic viscosity was obtained by extrapolating reduced viscosity to zero concentration.

(2) Measurement of melt index: It was measured according to ASTM method D1238 at 230° C. and a load of 2.16 kg.

(3) Measurement of tensile strength and tensile elongation: They were measured according to ASTM method D638 except that a loading speed was set to 50 mm/min. Tensile elongation was measured based on a break point.

(4) Measurement of flexural modulus and flexural strength: They were measured according to ASTM method D790 except that a loading speed was set to 10 mm/min.

(5) Measurement of Izod impact strength: It was measured with a Notched sample according to ASTM method D256 at room temperature (23° C.) and −30° C.

(6) Measurement of Shore hardness: It was measured according to ASTM method D2240, which follows D-Scale.

(7) Measurement of heat distortion temperature: It was measured according to ASTM method D648 at a load of 1.82 MPa.

(8) Measurement of scratch resistance: It was measured according to MS210-05 (Sapphire test) which was a standard of Hyundai™ Motor Company and Kia™ Motors Corporation, and GMW14688-A-10N (Erickson test) which was a standard of General Motors™ Company.

As shown in Table 7, the resin compositions of Samples 1 and 2 according to the present invention showed improved tactility owing to low hardness, high heat resistance, and high scratch resistance of Grade 4 that cannot be obtained by the existing combinations, while maintaining physical properties similar to the existing polypropylene resin compositions (Reference Comparative Sample).

In addition, FIG. 1 is a photograph of a texture surface which shows the result of assessing surface tactility of the Sample 1. For this sample, it was possible to form an embossed pattern upon a variety of textures, and it was softer to the touch by hand than the existing material, which was also confirmed by hardness.

Figure 2A:
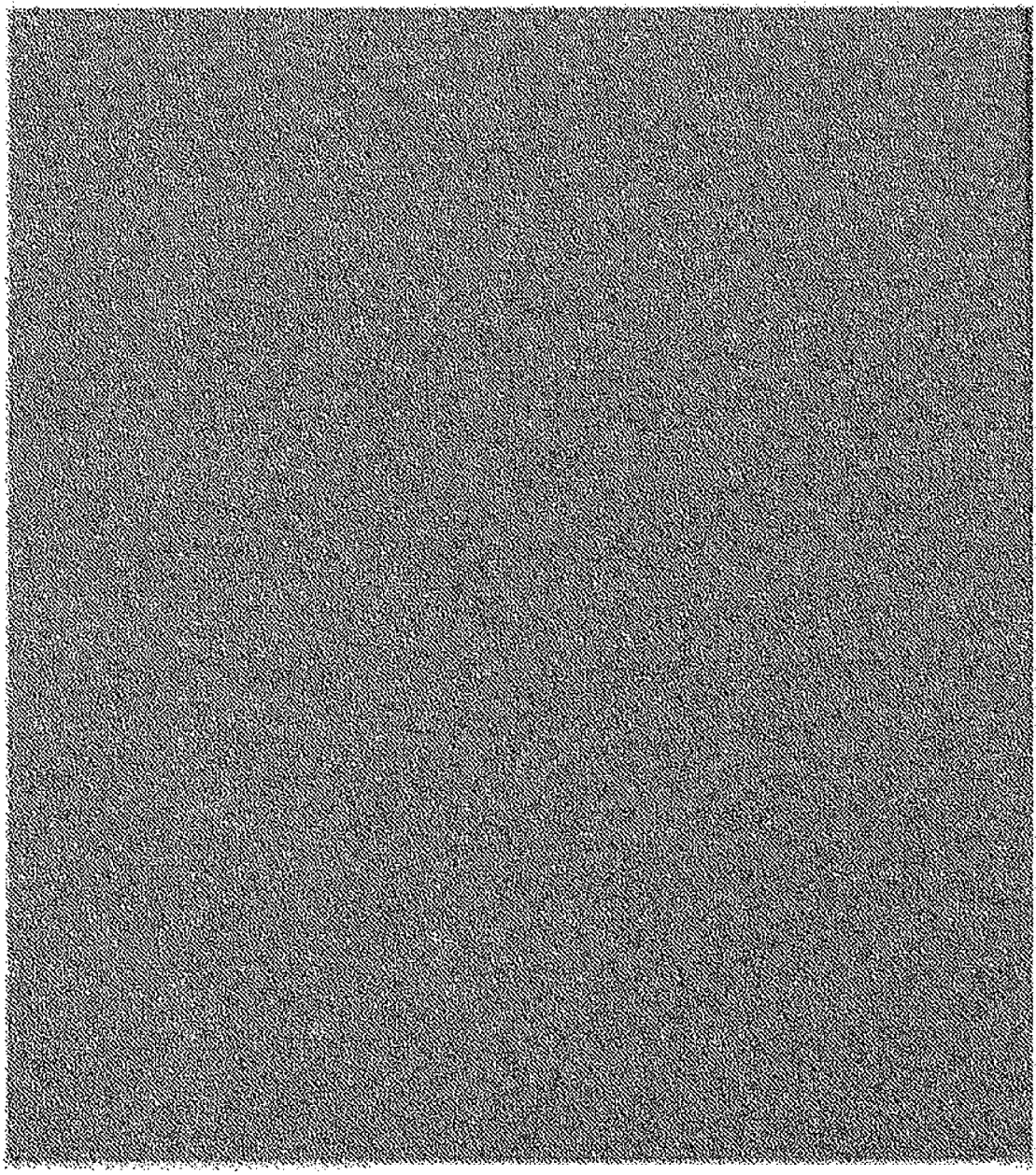
FIGS. 2A and 2B are photographs showing the results of assessing gloss, scratch resistance and hardness of Sample 1 (FIG. 2A) of the present invention and Reference Comparative Sample (FIG. 2B).
Figure 2B:
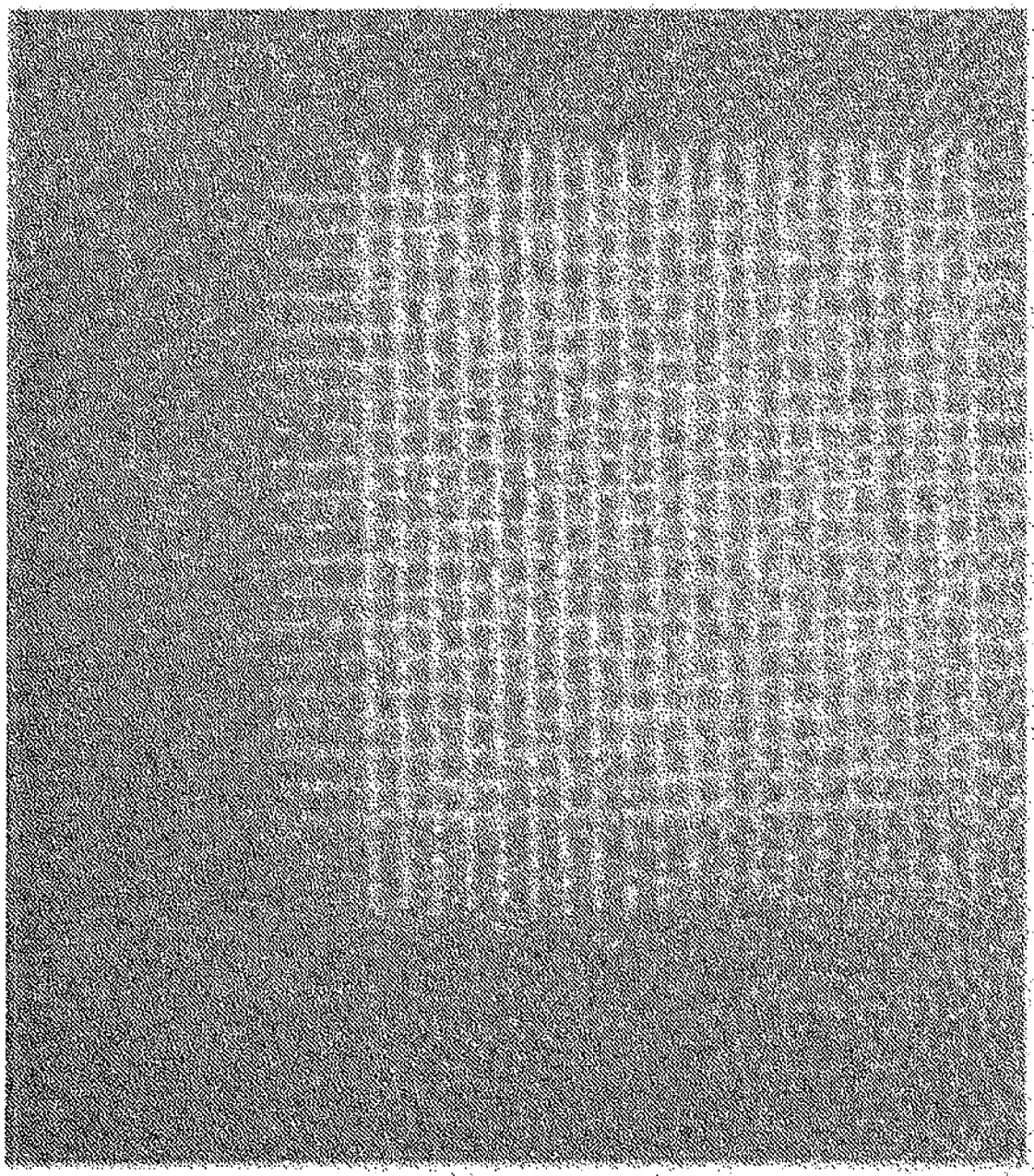

FIG. 2 is a photograph showing the results of assessing gloss, scratch resistance and hardness of Sample 1(a) according to the present invention and Reference Comparative Sample (b). (a) Sample 1 shows 0.5 of gloss (at 60 degrees), 0.05 of scratch (ΔL), and 41.5 of hardness (D), and (b) that of Reference Comparative Sample shows 1.4 of gloss (at 60 degrees), 1.96 of scratch (ΔL), and 65 of hardness (D). From these results, it was confirmed that the resin composition of the present invention showed improved tactility owing to low hardness, while maintaining similar physical properties to the existing polypropylene resin composition.

Further, as shown in Comparative Samples 1-3, it was found that it was possible to achieve a low hardness of 50 or less, a heat distortion temperature of 115 or higher and a flexural modulus of 1,400 or higher only within the mixed ratios between the pellets of the sample.

TABLE 7

Results of measuring physical properties of Samples 1 and 2 and Comparative Samples 1-3

| Items | Unit | Reference Comparative Sample (Existing material) | Sample 1 | Sample 2 | Comparative Sample 1 | Comparative Sample 2 | Comparative Sample 3 |
|---|---|---|---|---|---|---|---|
| Specific gravity | g/cm$^3$ | 1.04 | 1.02 | 1.07 | 0.98 | 1.19 | 1.51 |
| Tensile strength | MPa | 18.6 | 23 | 37 | 18 | 120 | 150 |
| Tensile elongation | % | 120 | 8.8 | 9.0 | 13.0 | 5.1 | 2.0 |
| Flexural strength | MPa | 29.4 | 28 | 42 | 21 | 180 | 210 |
| Flexural modulus | MPa | 1,765 | 1,478 | 2,400 | 1,250 | 4,900 | 9,800 |
| Izod impact strength (room temperature) | J/m | 451 | 265 | 445 | 180 | 475 | 260 |
| Izod impact strength (−30° C.) | J/m | 58.8 | 119 | 173 | 86 | 183 | 250 |
| Shore hardness (15 sec) | D | 65 | 41.5 | 48 | 37 | 67 | Unmeasurable |
| Heat distortion temperature (0.46 MPa) | ° C. | 125 | 126 | 140 | 113 | 145 | 160 |
| Scratch resistance (Erickson test) | ΔL | 1.96 | 0.05 | 0.32 | 0.03 | 2.37 | 7.98 |
| Scratch resistance (Sapphire test) | Grade | 3 | 4 | 4 | 4 | 2.5 | 2 |
| Exterior | — | Good | Good | Good | Good | Insufficient | Poor |

*Existing material: GS Caltex MT63I which conforms to the standard of MS 213-59 TD by Hyundai Motor Company and Kia Motors Corporation

TABLE 8

Results of measuring physical properties of Samples 1-2 and Comparative Samples 4-7

| Items | Unit | Sample 1 | Sample 2 | Comparative Sample 4 | Comparative Sample 5 | Comparative Sample 6 | Comparative Sample 7 |
|---|---|---|---|---|---|---|---|
| Specific gravity | g/cm3 | 1.02 | 1.07 | 1.02 | 1.07 | 1.02 | 1.07 |
| Tensile strength | MPa | 23 | 37 | 25 | 41 | 18 | 22 |
| Tensile elongation | % | 8.8 | 9.0 | 5.8 | 7.4 | 12 | 8.4 |
| Flexural strength | MPa | 28 | 42 | 39 | 47 | 17 | 21 |
| Flexural modulus | MPa | 1,478 | 2,400 | 1,540 | 2,780 | 1,153 | 1,570 |
| Izod impact strength (room temperature) | J/m | 265 | 445 | 232 | 385 | 426 | 387 |
| Izod impact strength (−30° C.) | J/m | 119 | 173 | 88 | 121 | 398 | 352 |
| Shore hardness (15 sec) | D | 41.5 | 48 | 57 | 68 | 31 | 35 |
| Heat distortion temperature (0.46 MPa) | ° C. | 126 | 140 | 127 | 142 | 68 | 74 |
| Scratch resistance (Erickson test) | ΔL | 0.05 | 0.32 | 0.04 | 0.29 | 0.12 | 0.54 |
| Scratch resistance (Sapphire test) | Grade | 4 | 4 | 4 | 4 | 4 | 4 |
| Exterior | — | Good | Good | Good | Good | Good | Good |

As shown in Comparative Samples 4-7 of Table 8, it was found that it was possible to achieve a low hardness of 50 or less and a heat distortion temperature of 115 or higher only within the mixed ratio of the pellet (B) of the sample. In particular, in instances where the content of ethylene-octene copolymer in the pellet (B) was low, as shown in Comparative Samples 4 and 5, hardness was increased, which makes it impossible to achieve good tactility. In the case that the content of ethylene-octene copolymer in the pellet (B) was high, as shown in Comparative Samples 6 and 7, hardness was further decreased, but heat resistance (heat distortion temperature) was also lowered, which makes it impossible to apply to automotive parts.

As shown in Table 7 and 8, it was confirmed that the polypropylene resin compositions of Samples 1 and 2 of the present invention exhibited good hardness, high scratch resistance and excellent tactility due to the proper use of each ingredient, compared with Comparative Samples 1 to 7, which deviated from the range(s) of the present invention.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene resin composition comprising:
   a first pellet (A) prepared using a resin composition (A) comprising
   (a-1) about 22 to about 58 wt % polypropylene resin, wherein said polypropylene resin is selected from the group consisting of polypropylene homopolymer alone or a mixture of polypropylene homopolymer and polypropylene-ethylene copolymers, wherein the polypropylene homopolymer has a pentad ratio (% mmmm) of about 96% or higher, and a limiting viscosity of about 0.7 to about 2.5 dl/g and the polypropylene homopolymer has a melt index of about 10 to about 25 g/10 min at 230° C.;
   (a-2) about 2 to about 8 wt % modified polypropylene resin; and
   (a-3) about 40 to about 70 wt % long fibers having a length of about 5 to about 20 mm; and
   a second pellet (B) prepared using a resin composition (B) comprising
   (b-1) about 1 to about 5 wt % polypropylene homopolymer;
   (b-2) about 30 to about 45 wt % polypropylene-ethylene copolymer;
   (b-3) about 50 to about 65 wt % thermoplastic elastomer; and
   (b-4) about 0 to about 5 wt % inorganic filler.

2. The polypropylene resin composition of claim 1, wherein the weight ratio of said first pellet (A) to said second pellet (B) is in the range of about 1:3 to about 1:1.

3. The polypropylene resin composition of claim 1, wherein the polypropylene-ethylene copolymer (a-1, b-2) has an average molecular weight of about 80,000 to about 600,000 g/mol and a specific gravity of about 0.89 to about 0.91.

4. The polypropylene resin composition of claim 1, wherein the modified polypropylene (a-2) is a polypropylene polymer grafted with about 0.5 to about 5 wt % of unsaturated carbonic acid or a derivative thereof, and has an average molecular weight of about 100 to about 5,000 g/mol.

5. The polypropylene resin composition of claim 4, wherein the unsaturated carbonic acid is one or more selected from the group consisting of maleic acid, acrylic acid, methacrylic acid and anhydrous maleic acid.

6. The polypropylene resin composition of claim 1, wherein the long fiber (a-3) is one or more selected from the group consisting of glass fiber, carbon fiber, hemp fiber, cellulose fiber and volcanic rock fiber.

7. The polypropylene resin composition of claim 6, wherein the glass fiber has a diameter of about 10 to about 30 μm.

8. The polypropylene resin composition of claim 1, wherein the polypropylene-ethylene copolymer (a-1, b-2) is comprises about 3 to about 30 wt % ethylene content.

9. The polypropylene resin composition of claim 1, wherein the thermoplastic elastomer (b-3) is selected from the group consisting of olefinic thermoplastic elastomer, styrenic thermoplastic elastomer, urethanic thermoplastic elastomer and a mixture thereof.

10. The polypropylene resin composition of claim 9, wherein said second pellet (B) comprises 2-fold lower oil than the thermoplastic elastomer which is styrenic thermoplastic elastomer.

11. The polypropylene resin composition of claim 10, wherein said oil is one or more selected from the group consisting of paraffin-based oil, aromatic oil and naphtha-based oil.

12. The polypropylene resin composition of claim 1, wherein said inorganic filler (b-4) is one or more selected from the group consisting of magnesium-based needle-shaped whisker, titanic acid-based needle-shaped whisker and precipitated calcium carbonate.

13. A molded article prepared with the polypropylene resin composition of claim 1.

14. The article of claim 13, wherein said article is an automobile part.

15. A method for enhancing the tactility and scratch resistance of an automotive part comprising applying a polypropylene resin composition of claim 1 to said automotive part, thereby enhancing the tactility and scratch resistance of said automotive part.

16. A kit for enhancing the tactility and scratch resistance of an article comprising the polypropylene resin composition of claim 1 and instructions for its use.

17. The polypropylene resin composition of claim 1, wherein the first pellet (A) prepared using a resin composition (A) comprising:
  (a-1) 37 wt % polypropylene homopolymer;
  (a-2) 3 wt % modified polypropylene resin; and
  (a-3) 60 wt % long fibers; and
wherein the second pellet (B) prepared using a resin composition (B) comprising:
  (b-1) 5 wt % polypropylene homopolymer;
  (b-2) 35 wt % polypropylene-ethylene copolymer;
  (b-3) 60 wt % ethylene-octene copolymer.

* * * * *